(12) United States Patent
Anders

(10) Patent No.: US 6,491,334 B1
(45) Date of Patent: Dec. 10, 2002

(54) SEALING PROFILE FOR A MOTOR VEHICLE

(75) Inventor: Jens Anders, Marienhagen (DE)

(73) Assignee: Meteor Gummiwerke K.H. Bädje GmbH & Co., Bockenem (DE)

( * ) Notice: Subject to any disclaimer, the term of this patent is extended or adjusted under 35 U.S.C. 154(b) by 0 days.

(21) Appl. No.: 09/555,369

(22) PCT Filed: Feb. 18, 1999

(86) PCT No.: PCT/EP99/01066
§ 371 (c)(1),
(2), (4) Date: May 30, 2000

(87) PCT Pub. No.: WO99/47374
PCT Pub. Date: Sep. 23, 1999

(30) Foreign Application Priority Data

Mar. 14, 1998 (DE) ..................... 298 04 548 U

(51) Int. Cl.$^7$ .............. B60J 10/10; B60J 7/12
(52) U.S. Cl. .............. 296/107.04; 296/107.07; 296/93
(58) Field of Search ....... 296/107.04, 107.07, 296/107.05, 107.11, 107.12, 121, 135, 93

(56) References Cited

U.S. PATENT DOCUMENTS

| | | | |
|---|---|---|---|
| 3,090,646 A | | 5/1963 | Johnson ............ 296/107.11 |
| 5,311,711 A | * | 5/1994 | Desir, Sr. ............ 296/93 |
| 5,429,844 A | * | 7/1995 | Galardi ............ 296/93 |
| 5,466,508 A | * | 11/1995 | Brocke et al. ......... 296/93 X |
| 5,470,422 A | * | 11/1995 | Gold ............... 296/93 X |
| 5,626,383 A | * | 5/1997 | Lee et al. ............ 296/93 X |
| 5,693,419 A | * | 12/1997 | Nozaki ............... 296/93 |
| 5,738,402 A | * | 4/1998 | Aydt et al. ........... 296/107.09 |
| 5,766,703 A | * | 6/1998 | Mori et al. ........... 296/93 X |
| 5,935,356 A | * | 8/1999 | Soldner .............. 296/93 X |
| 5,950,366 A | * | 9/1999 | Uhlmeyer ............ 296/93 X |
| 6,110,546 A | * | 8/2000 | Honda et al. ......... 296/93 X |

FOREIGN PATENT DOCUMENTS

| | | | |
|---|---|---|---|
| DE | 8106708 | | 3/1981 |
| DE | 44 41 669 | | 11/1995 |
| DE | 44 41 667 | | 12/1995 |
| EP | 0322949 | * | 7/1989 ......... 296/135 |
| GB | 2136038 | | 9/1984 |

OTHER PUBLICATIONS

Patent Abstracts of Japan, 7,290,955, Nov. 7, 1995 (Nishikawa Rubber Co. Ltd).

* cited by examiner

*Primary Examiner*—D. Glenn Dayoan
*Assistant Examiner*—Patricia L. Engle
(74) *Attorney, Agent, or Firm*—Synnestvedt & Lechner LLP

(57) ABSTRACT

A sealing profile having a profile base for attachment by insertion into a receiving orifice of a bodywork part and has a sealing portion which is attached to the profile base. The profile base is provided with a structural part and a holding limb which is formed as one piece therewith. The holding limb is formed for the purpose of engaging behind a first projection of the bodywork part and is formed so as to be able to fold in a resilient manner in the direction of the structural part. The profile base includes a holding surface which faces away from the holding limb and opposite which lies an edge of a fabric top. A locking strip is attached to the edge and in the assembled state is disposed inside the receiving orifice.

21 Claims, 1 Drawing Sheet

SEALING PROFILE FOR A MOTOR VEHICLE

BACKGROUND

The present invention relates to a sealing profile for a motor vehicle.

A known sealing profile of this type is shown in German Patent No. DE 44 41 669 C1 (FIG. 4), the profile base of which is formed in the shape of a wedge and is made from cellular rubber and comprises a hollow space. The sealing portion is formed as a profile which is separate from the profile base and has its own base which is anchored in an additional receiving orifice of the bodywork part. This construction is costly to produce and assemble.

It is known per se from German Patent No. DE 44 41 667 C1 to pull the top lining around an edge of a light metal profile and to insert it with a thickened part on its longitudinal edge into a first receiving groove of an additional metallic holding rail. As shown therein, the base of a sealing profile is urged into a second receiving groove of the holding rail. Moreover, the sealing profile comprises a tubular sealing portion which is integrally formed on the base. The holding rail is then screwed to the light metal profile.

It is known per se from U.S. Pat. No. 3,090,646 to pull the folding top around an edge of a metal profile and to secure it at this site by virtue of an outer metallic trim strip. A vinyl cord is stitched into the longitudinal edge of the folding top. The edge bead produced in this manner is urged together with a base of a sealing profile into an undercut groove of the metal profile. A further incompressible vinyl cord is urged into a hollow space in the base for fixing purposes. Two tubular sealing portions of the sealing profile are integrally formed on the base.

Another known sealing profile is disclosed in JP 07290955 A. As disclosed therein, the structural part comprises on its edge lying opposite the foldable holding limb a further, fixed holding limb. The sealing profile is inserted and urged into a holding rail having a substantially Ω-shaped cross-section such that ultimately both holding limbs are locked in a receiving chamber of the holding profile.

It is known per se from German Patent No. DE 81 06 708 U1 to wrap the edge of a top interior covering around the edge of an inner flange portion and to fix it in this position by virtue of an attached synthetic material strip comprising a barb.

It is the object of the invention to simplify the process of producing and attaching the sealing portion.

SUMMARY OF THE INVENTION

The present invention provides a sealing profile for a motor vehicle having a profile base for attachment by insertion into a receiving orifice of a bodywork part of the vehicle and having an elastic sealing portion. The profile base includes a structural part and a holding limb which is formed as one piece with the structural part. The holding limb is formed for the purpose of engaging behind a first projection on the bodywork part and is formed in such a manner as to be able to fold in a resilient manner in the direction of the structural part. The profile base further includes a holding surface facing away from the holding limb. An edge of a fabric top of the motor vehicle lies opposite the holding surface. The holding surface extends at least approximately in parallel with an insertion direction of the profile base. A second projection on the bodywork part lies opposite the first projection at a spacing. A locking strip is attached to the side of the edge of the fabric top facing away from the holding surface. The locking strip is disposed in the receiving orifice and engages behind the second projection. The elastic sealing portion is attached to the profile base. Preferably, the sealing profile is extruded, i.e. is continuous in the longitudinal direction in all of its components. The holding surface of the profile base renders it possible for the edge of the top fabric to lie in position in a flat and secure manner and for this edge to be fixed in a correspondingly effective manner.

The locking strip can be adhered to the edge of the fabric top, and can be made of hard rubber. These features present a favourable way of attaching the locking strip to the top fabric or represent an advantageous material for the locking strip.

As an additional feature, the structural part can include at least one longitudinal rib lying against the first projection. This renders it possible to minimize movements between the sealing profile and the bodywork part.

In another feature, the profile base can be co-extruded from dense rubber and the sealing portion co-extruded from cellular rubber. Here, the sealing profile can be produced in a particularly favourable manner.

BRIEF DESCRIPTION OF THE DRAWINGS

These and further features of the invention will be explained in detail hereinunder with reference to the exemplified embodiments illustrated in the drawings, in which.

DETAILED DESCRIPTION

Figure 1:
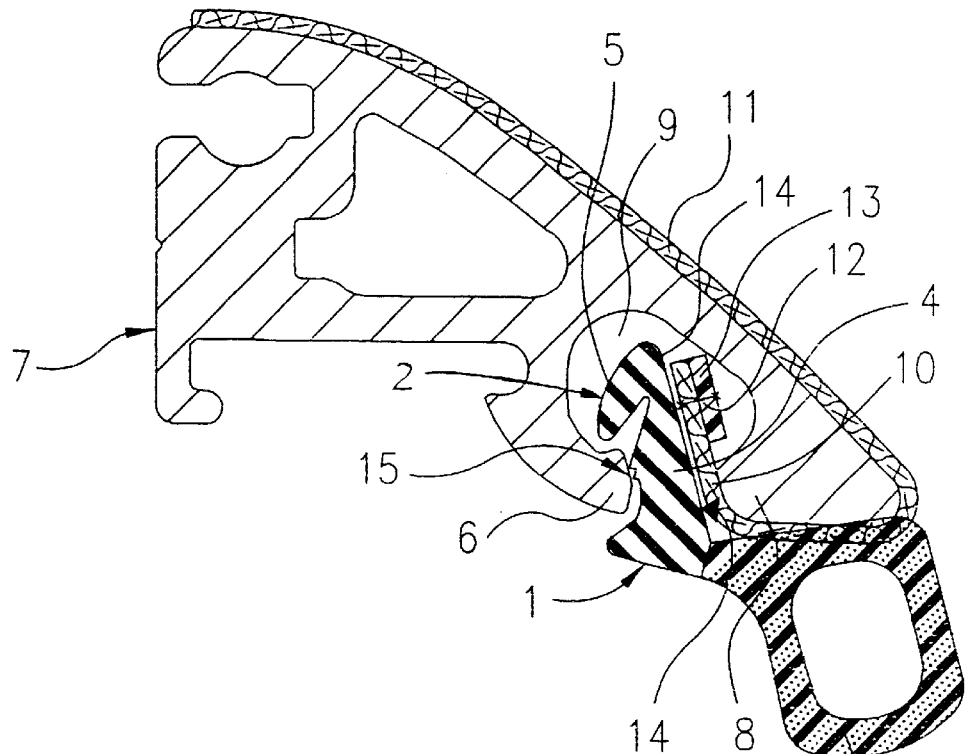
FIG. 1 shows a cross-section of a bodywork part having a profile base and edge of a fabric top inserted into the receiving orifice of said bodywork part.

As shown in FIG. 1, a sealing profile 1 for a motor vehicle comprises a profile base 2 and an elastic sealing portion 3 which is attached to the profile base 2. The sealing profile 1 consists in a manner known per se of at least one elastomer, whose properties are tailored to suit the respective application. For example, the profile base 2 can therefore consist of a harder elastomer than the sealing portion. The profile base 2 comprises a structural part 4 and a holding limb 5 which is formed as one piece with the structural part 4. The holding limb 5 is formed for the purpose of engaging behind a first projection 6 of a bodywork part 7 and is formed in such a manner that it can be folded in a resilient manner in the direction of the structural part 4.

A second projection 8 of the bodywork part 7 lies opposite the first projection 6 and spaced therefrom. A receiving orifice 9 of the bodywork part 7 continues above the projections 6, 8.

An edge 10 of a fabric top 11 of the motor vehicle protrudes into the receiving orifice 9. Furthermore, a locking strip 13 which is stitched to the edge 10 by means of a stitched seam 12 is disposed inside the receiving orifice 9. The locking strip 13 cooperates with the second projection 8 for the purpose of positively locking the edge 10 in the receiving orifice 9.

The profile base 2 comprises a holding surface 14 which faces away from the holding limb 5 and against which lies the edge 10. On the side lying opposite the holding surface 14, the structural part 4 is provided with two longitudinal ribs 15 which, in the assembled state as shown in FIG. 1, lie against the first projection 6 and reduce undesired relative movements between the sealing profile 1 and the edge 10 on the one hand and the bodywork part 7 on the other hand.

In order to complete the assembly as shown in FIG. 1, the edge 10 can be inserted initially into the receiving orifice 9 and subsequently the profile base 2 can be inserted in an insertion direction 16 into the receiving orifice 9. At the height of the projections 6, 8 the holding limb 5 is folded against the structural part 4. Above the first projection 6, the holding limb 5 then moves in a resilient manner to its relaxed position shown in FIG. 1, in which it forms a positive locking arrangement with the first projection 6.

In order to complete the assembly as shown in FIG. 1, it is possible, on the other hand, to perform an alternative procedure in that outside the receiving orifice 9 the edge 10 is initially placed against the holding surface 14 and then this unit is inserted into the receiving orifice 9 through the narrowed region between the projections 6, 8.

Figure 2:
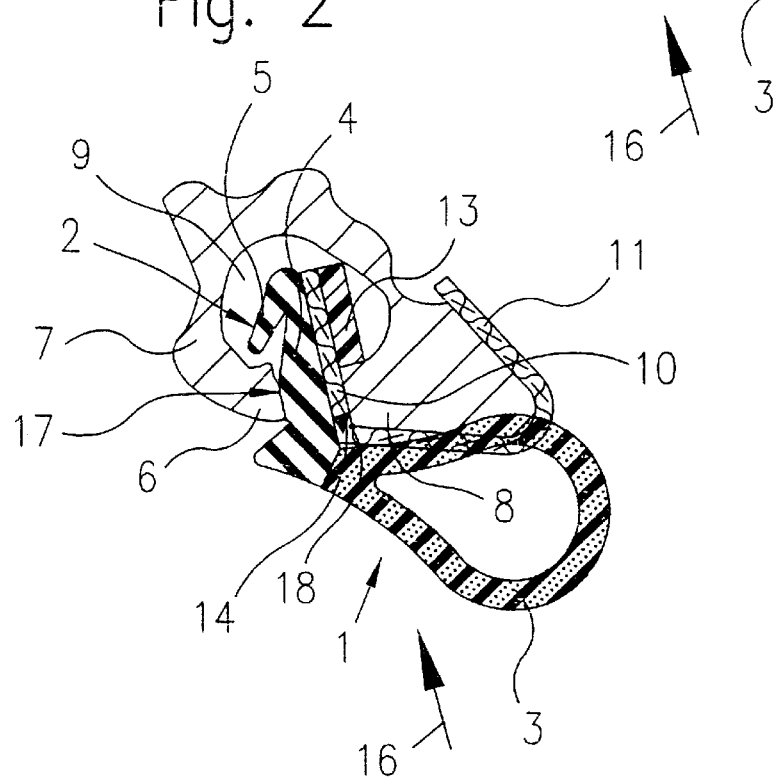
FIG. 2 shows a cross-section of a part of an alternate embodiment.

In FIG. 2, parts similar to those in FIG. 1 are designated by like reference numerals.

As shown in FIG. 2, the locking strip 13 consists of a synthetic material and is adhered to the edge 10. In FIG. 2, a frictional surface 17 is formed on the structural part 4 in place of the longitudinal ribs 15 and in the assembled state as shown in FIG. 2 said frictional surface lies against the first projection 6 by means of frictional engagement. The locking strip 13 is supported on the second projection 8. The second projection 8 is also formed having a sharp edge 18 which additionally protects the fabric top 11 from being pulled out of the receiving orifice 9.

What is claimed is:

1. A sealing assembly of a motor vehicle that has a fabric top having an edge, and which motor vehicle further has a body part having a first projection and a second projection spaced from said first projection, said first and second projections defining a receiving opening therebetween which extends behind said projections, said assembly comprising:

a locking strip attached to a side of said edge of said fabric top;

a sealing profile having a profile base for insertion into said receiving opening and an elastic sealing portion attached to said profile;

said profile base comprising:
      a structural part defining a holding surface;
      a holding limb extending from and joined to said structural part, said holding limb being resiliently moveable towards said structural part for insertion of said profile base into said opening and then returning away from said structural part to engage behind said first projection on the body part; and
      a holding surface facing away from said holding limb and extending approximately parallel to an insertion direction of the profile base into said receiving opening;

whereby said profile base and said edge of said fabric top are retained in said receiving opening, said locking strip being on a side of said edge of said fabric top facing away from said holding surface and positioned behind said second projection in said receiving opening, and said holding limb being positioned behind said first projection in said receiving opening.

2. The sealing assembly of claim 1, wherein said locking strip is adhered to said edge of said fabric top.

3. The sealing assembly of claim 2, wherein said locking strip comprises hard rubber.

4. The sealing assembly of claim 2, wherein said structural part comprises a frictional surface engaging said first projection.

5. The sealing assembly of claim 1, wherein said locking strip comprises hard rubber.

6. The sealing assembly of claim 1, wherein said structural part comprises at least one longitudinal rib engaging said first projection.

7. The sealing assembly of claim 6, wherein said profile base and said sealing portion are co-extruded, and wherein said profile base comprises dense rubber and said sealing portion comprises cellular rubber.

8. The sealing assembly of claim 7, wherein said locking strip comprises synthetic material.

9. The sealing assembly of claim 7, wherein said structural part comprises a frictional surface engaging said first projection.

10. The sealing assembly of claims 6, wherein said locking strip is adhered to said edge of said fabric top.

11. The sealing assembly of claim 10, wherein said locking strip comprises synthetic material.

12. The sealing assembly of claim 6, wherein said locking strip comprises hard rubber.

13. The sealing assembly of claim 6 wherein said locking strip comprises synthetic material.

14. The sealing assembly of claim 13, wherein said structural part comprises at least one longitudinal rib engaging said first projection.

15. The sealing assembly of claim 6, wherein said structural part comprises at least one longitudinal rib engaging said first projection.

16. The sealing assembly of claim 1, wherein said profile base and said sealing portion are co-extruded, and wherein said profile base comprises dense rubber and said sealing portion comprises cellular rubber.

17. The sealing assembly of claim 1, wherein said structural part comprises a frictional surface engaging said first projection.

18. The sealing assembly of claim 1, wherein said holding limb is formed as a single piece with said structural part.

19. A sealing profile for use in a sealing assembly of a motor vehicle that has a fabric top having an edge and a locking strip attached to a side of said edge, and which motor vehicle further has a body part having a first projection and a second projection spaced from said first projection, said first and second projections defining a receiving opening therebetween which extends behind said projections, said sealing profile comprising:

an elastic sealing portion; and
   a profile base for insertion into said receiving opening, said profile base being attached to said elastic sealing portion and comprising:
      a structural part defining a holding surface; and
      a holding limb extending from and joined to said structural part, said holding limb being resiliently moveable towards said structural part for insertion of said profile base into said opening and then returning away from said structural part to engage behind said first projection on the body part;
   said profile base further comprising a holding surface facing away from said holding limb and extending approximately parallel to an insertion direction of the profile base into said receiving opening;

whereby said profile base and said edge of said fabric top may be retained in said receiving opening with said locking strip being positioned behind said second projection in said receiving opening and said holding limb being positioned behind said first projection in said receiving opening.

20. The sealing profile of claims 19, wherein said holding limb is formed as a single piece with said structural part.

21. A sealing profile for a motor vehicle that has a fabric top having an edge and a locking strip attached to a side of said edge, said motor vehicle having a body part defining a first projection and a second projection spaced from said first projection, said first and second projections defining a receiving opening therebetween which extends behind said projections, said sealing profile comprising:

a profile base for attachment to said motor vehicle by insertion into said receiving opening, said profile base comprising:

a structural part having a holding limb extending from and joined to said structural part, said holding limb being resiliently moveable towards said structural part for insertion of said profile base into said receiving opening and then returning away from said structural part to engage behind said first projection on said body part, said structural part defining a holding surface facing away from said holding limb and extending approximately parallel to an insertion direction of said profile base into said receiving opening; and an elastic sealing portion integrally formed with said profile base;

whereby said profile base and said elastic sealing portion are insertable into said receiving opening as a unit; and whereby said profile base and said edge of said fabric top may be retained in said receiving opening with said locking strip positioned in said receiving opening behind said second projection and said holding limb being positioned in said receiving opening behind said first projection.

* * * * *